United States Patent Office 3,287,440
Patented Nov. 22, 1966

3,287,440
PROCESS FOR THE CROSS-LINKING OF UNSATURATED COPOLYMERS AND ETHYLENE-PROPYLENE TERPOLYMERS
Arnold Giller, Wehen, Taunus, Germany, assignor to Chemische Werke Albert, Wiesbaden-Biebrich, Germany, a corporation of Germany
No Drawing. Filed Oct. 22, 1964, Ser. No. 405,818
Claims priority, application Germany, May 14, 1962, C 26,983; Aug. 27, 1962, C 27,790; May 11, 1963, C 29,915; Jan. 29, 1964, C 31,998; Jan. 31, 1964, C 32,017
41 Claims. (Cl. 260—846)

This invention relates to cross-linking or vulcanisation of unsaturated plastics by phenol-aldehyde resins. It is a continuation-in-part application of my copending application Serial No. 277,432, filed May 2, 1963, which in turn is a continuation-in-part application of my copending applications Serial No. 37,111, filed June 20, 1960, now U.S. Patent No. 3,189,567, Serial No. 140,637, filed September 19, 1961, now abandoned Serial Nos. 154,825, now U.S. Patent No. 3,220,964 and 154,826, both filed November 24, 1961 and Serial No. 194,995, filed May 15, 1962, now abandoned.

It is known to vulcanize elastomers such as butyl rubber, acrylonitrile-butadiene rubber, butadiene styrene rubber, by phenol resins in the presence of metal halides of the II or II group of the periodical system or of heavy metals. The metal halides mentioned may also be produced in the mixture from halogen-donors, such as chlorosulfonated polyethylene, metal oxides or metal salts of weak acids.

It is also known to produce copolymers from multiple olefinically unsaturated compounds with 4 to 14 carbon atoms, preferably those wtih conjugated double bonds such as butadiene, isoprene, cyclopentadiene, dicyclopentadiene, cis - cis - cyclooctadiene, and straight-chained mono-olefins with 2 to 10 carbon atoms, particularly α-olefins such as ethylene, propylene, butylene etc. It is known that such unsaturated copolymers may be further cross-linked under the action of peroxides.

According to the present invention (I) copolymers of at least one multiple olefinically unsaturated compound having 4 to 14 carbon atoms with at least one straight-chained mono-olefinic hydrocarbon of 2 to 10 carbon atoms, (II) copolymers of a multiple olefinically unsaturated compound having 4 to 14 carbon atoms, containing at least 10 mol percent, preferably at least 50 mol percent, of a cyclic compound, with at least one branched mono-olefin with 4 to 12, preferably 4 to 7 carbon atoms, (III) copolymers of a multiple olefinically unsaturated compound of 4 to 14 carbon atoms with a mixture of a mono-olefinic hydrocarbon containing 2 to 10 carbon atoms and up to 90 mol percent, calculated on the total mono-olefin component, of at least one branched mono-olefinic hydrocarbon having 4 to 12 carbon atoms, are further cross-linked by quite another class of cross-linkings agents, i.e. by phenol aldehyde resins. The cross-linking is carried out in the presence of at least one halide, preferably one or more metal chlorides or bromides of the II or III group of the periodical system or of heavy metals other than those belonging to groups II and III. The term "heavy metals" is intended to embrace metals of a specific gravity above 4.

In other terms, the present invention is concerned with a method of vulcanizing the afore-mentioned copolymers with a phenol aldehyde resin. A preferred embodiment comprises activating the afore-mentioned copolymers, such as particularly an ethylene-propylene-terpolymer and a phenol aldehyde resin in the presence of a filler while regulating the self-reactions of the polymer and the said resin, i.e. the degradation of the polymer and the auto-condensation of the resin. Such regulation is effected by bringing the reactivity of the polymer as close as possible to the reactivity of the said resin to promote cross-linking between the polymer and the said resin and thereby obtaining a vulcanisate. In general terms the activation is effected by halides, particularly chlorides and bromides of metals or complex compounds thereof which under the conditions of vulcanization are able to split off or to generate protons. As is more broadly described below, the metal halides may be generated in the mixture to be vulcanized before or during the vulcanisation.

Suitable mono-olefin components of the copolymers are, for example ethylene, propylene, butene-1, pentene-1, hexene-1 heptene-1, octene-1 and decene-1. As diene component there may be mentioned for example compounds with conjugated double bonds which contain at least one $CH_2=C<$ group. Suitable compounds are those of the formula $CH_2=CH—CR^1=CH_2$, in which $R^1$ means a hydrogen, methyl, ethyl, propyl, chlorine, fluorine, acetoxy, chloroacetoxy, butyroxy or cyano radical. In other words, as diene-component there may be mentioned, for example, butadiene, isoprene, 2,3-dimethyl-butadiene-1,3, 1,2-dimethyl-butadiene-1,3, 1,3-dimethyl-butadiene-1,3, 1,4-dimethyl-butadiene-1,3, 1-ethyl-butadiene-1,3, 2-ethyl-butadiene-1,3, 2-propylbutadiene-1,3, 2-chlorobutadiene-1,3, 2-fluorobutadiene-1,3, 2-acetoxy-butadiene-1,3, 2-chloroacetoxy-butadiene-1,3, 2-butyroxy-butadiene-1,3 and 2-cyanobutadiene-1,3, and also, for example, piperylene, the various hexadienes such as hexadiene-1,3, 2- or 4-methyl-pentadiene-1,3, tetradecadiene-1,3, 2-phenyl-1,3-butadiene or 1-phenyl-2,3-dimethyl-butadiene-1,3, cyclopentadiene, dicyclopentadiene, cis-cis-cyclooctadiene and 5-methylene-norbornene-2. The portion of the diene-component in the copolymers is generally from 0.5 to 10, preferably 1 to 5 mol percent.

The said copolymers may be produced according to various procedures and naturally may also be built up from olefin mixtures. Thus, for example, copolymers from at least 20 mol percent ethylene, and α-olefin of the formula $R—CH=CH_2$, in which R means an alkyl radical with 1 to 8 carbon atoms, and 0.5 to 10 mol percent of dicyclopentadiene are suitable.

As branched olefins, which may be used in copolymers with cyclic compounds, there are mentioned, for example, isobutylene, its dimers or trimers or ethylmethylethylene. The portion of these compounds is generally from 10 to 70 and preferably up to 50 mole percent, calculated on the mono-olefin component.

The fact that such copolymers may be cross-linked by the phenol aldehyde resins is fundamentally new, and very important insofar as these copolymers have properties completely different from butyl rubber and other elastomers. For example, they are distinguished from butyl rubber by the fact that they are substantially less branched. The polymers to be cross-linked according to the invention may contain the double bonds either in the main chains or in side-chains.

The phenol resins are obtained, for example, by condensation of the phenol with the aldehyde in an alkaline medium and contain—if desired esterified—phenolic in addition to free, etherified or esterified alcoholic hydroxyl groups or instead of these halogen, e.g. bromine atoms. They are generally used in an amount from 1 to 15, preferably 3 to 9 parts by weight per 100 parts of plastic. For example, resins based on such phenols, in which two of the three o,o,p-positions, preferably the two o-positions, referred to the phenolic hydroxyl group, may be substituted on reaction with an aldehyde. This is possible in the reaction of such phenols which contain a substituent in one of the o,o,p-positions, preferably in p-position. Preferably this substituent is a hydrocarbon radical. It may also be another radical, which does not disturb the condensation in o-position, for example, halogen such as chlorine, —$NO_2$, —CN. However, it is also possible with such phenols, the o,o,p-positions of which are free and which contain substituents with altogether at least 4 carbon atoms in m-position to the phenolic hydroxyl group. If the phenols contain several substituents, these may be equal or different ones. Preferably they are hydrocarbon radicals with 1 to 12 carbon atoms such as the methyl, ethyl, propyl, isopropyl, butyl, sec-butyl, isobutyl, tert.-butyl, the straight-chained, branched or cyclic primary, secondary or tertiary pentyl, hexyl, heptyl, octyl, decyl or dodecyl radical, for example the tert.-amyl radical, the normal or isooctyl radical such as the ethylhexyl or diisobutyl radical, the cyclohexyl, benzyl or phenyl radicals which may be substituted with an alkyl radical, e.g. methylcyclohexyl, tolyl, xylyl. Preferably all substituents together contain 1 to 12 carbon atoms and the substituents in p-position 4 to 12 carbon atoms. As may the phenol nuclei, the said substituents may also contain chloro- or bromo substituents.

As phenol resins there may also be used products, which are formed by cyclic condensation of bifunctional phenoldialcohols. Such ring condensates may be used in pure form or in the form of mixtures of condensation products, which contain these cyclic products in an amount of, for example, at least 85 percent by weight. In order to facilitate working in these products into the plastics it is advisable to use them together with distribution agents, for example, together with plasticizers mentioned below. The cyclic condensates may be built up from 3, 4 or still more phenol nuclei. They correspond to the general formula

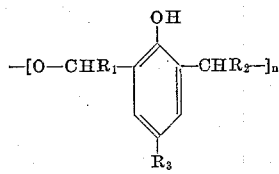

in which $R_1$ and $R_2$ may be equal or different; but generally they are hydrogen, or if desired, an alkyl radical with 1 to 3 carbon atoms, for example, the methyl radical, or the furyl radical. $R_3$ preferably is one of the radicals mentioned above for the substituents in the o,o,p-positions.

Particularly simple is the production of ring condensates, in which $R_3$ is an alkyl radical with 4 to 12 carbon atoms. $n$ is an integer and is at least 2; it indicates how many phenol nuclei are combined to a ring. Preferably $n$ is 3 to 5, but it may also be higher, for example 8.

Formation and properties of the ring condensates, for example of p-tert.-butyl phenol and p-octylphenol are described in "Kunststoffe," volume 52 (1962) 19–21.

Other suitable phenol resins are the so-called trifunctional resins, that are resins, which have been obtained from tri-functional phenols—i.e. phenols, with three free o,o,p-positions—by a reaction with an aldehyde. Such phenols are, for example, phenol, m-cresol or homologues such as m-xylenol.

Other, also suitable resins are so-called diphenol resins. These may be produced by condensation of a diphenol such as resorcinol or a binuclear diphenol in an alkaline medium with an aldehyde. Suitable diphenols are dihydroxy diphenyl, dihydroxy dibenzyl, dihydroxy diphenylmethane, or homologues thereof, e.g. dihydroxy diphenyl-methyl - methane, -dimethyl - methane, -ethyl - methane, -methylethyl-methane, -diethyl-methane, -methylpropyl-methane, -dipropyl-methane, -methyl hexyl-methane, -dihexylmethane, -methyl-cyclohexyl-methane, or products substituted in the phenyl nuclei such as the 3-methyl, 3,5-dimethyl or 3,3'-diisopropyl substitution products. Diphenols containing the two hydroxy groups in the p,p'-positions are especially preferred.

As aldehydes, which may be reacted with the above-mentioned phenols, above all those with 1 to 7 carbon atoms may be used such as acetaldehyde, propionaldehyde, butyraldehyde, isobutyraldehyde, crotonaldehyde, benzaldehyde, furfural or mixtures of several aldehydes, but preferably formaldehyde. Of course, these aldehydes also may be reacted with mixtures of several phenols.

The said resins may be used per se, but they may also be modified. Thus, the alcoholic hydroxyl groups formed may be etherified or esterified before or during the condensation of the phenols with the aldehyde. The etherification preferably is carried out with monohydric alcohols to such an extent that they are still soluble in organic solvents. Suitable monohydric alcohols are, for example, methyl, ethyl, propyl, isopropyl, butyl, octyl, isooctyl, dodecyl, or benzyl alcohols. The esterification may preferably be effected with monobasic carboxylic acids, such as acetic acid, propionic acid or butyric acid. By such an etherification or esterification respectively the reactivity of the resins is modified in such a way that a possible autocondensation of the resins is reduced or completely prevented and the cross-linking with the polymer chains is favoured. The modification of the resins may also occur by replacing the alcoholic hydroxy groups with halides, so that for example chloromethyl groups are introduced in the o- and/or p-position to the phenolic hydroxyl group. If desired, the phenolic hydroxyl group may also be esterified, for example with the above-mentioned monohydric carboxylic acids.

The said partially etherified or esterified resins respectively may be further modified, for example plasticised. Thus, the resins may be reacted at a temperature above 70° C. with a hydroxy fatty acid which contains more than 10 carbon atoms or a glyceride thereof, whereby a resin is obtained, which is still soluble in organic solvents. Besides with hydroxy fatty acids or their glycerides the resins may also be plasticized under the conditions mentioned above with fatty oils, neutral reacting resins such as urea resins or polyester resins comprising esters of dicarboxylic acids and polyhydric alcohols or esters of polyhydric alcohols with a mixture of (A) dicarboxylic acids and (B) either fatty or resin acids or a mixture of fatty and resin acids. The production of such plasticized resins is described in British specification 409,397.

The afore-mentioned resins are generally semi-solids. They may conveniently be used in conjunction with varying amounts of low-boiling solvents such as butanol, benzene, toluene or xylene in the form of viscous liquids. It is more convenient, however, to use the resins in the form of a solution in high-boiling liquids. Such liquids may be, for example, compounds which may be used per se as plasticizers in rubber compositions, for example, mineral oils, aliphatic or aromatic polyesters, esters of polybasic carboxylic acids, polyglycols, polyhydric alcohols or mixtures of such substances. The said high-boiling compounds may be monomeric or polymeric in nature. The low-boiling solvents may be replaced by the said high-boiling solvents by mixing the mixtures of the resins and the low-boiling solvents with a suitable amount, e.g. 10 to 50% by weight, of a higher-boiling compound and distilling off the lower-boiling solvent in vacuo, preferably at a temperature below 100° C.

As metal halides, it is preferred to use the chlorides and bromides especially stannous chloride, iron chloride, or iron bromide. One may also use other halides, such as stannous iodide or the chlorides and bromides of the metals mentioned below. Basic halides such as Sn(OH)Cl are also suitable.

The effect of the metal halides may be increased by the addition of fillers, especially active or semi-active carbon black. The metal halides may be incorporated into the elastomer mixture per se. In this case the compounding and processing procedures are rendered more difficult since the metal halides added per se may often incorporate into the mixtures of the plastics with difficulty and cause considerable corrosion. In order to improve the preparation of the mixtures, it is, therefore, more desirable to use complex compounds of metal halides of the general formula $X_mMe(R_1OR_2)_n$ or to produce the metal halides in situ, i.e. in the plastic mixture, during the mixing procedure, by reacting a halogen-donor and a metal compound being capable of reacting with the halogen-donor at elevated temperature. By this latter embodiment also corrosion is reduced. The term "halogen-donor" is used to denote organic compounds from which halogen or hydrogen halide may be split off.

In the formula $X_mMe(R_1OR_2)_n$ X is a halogen, preferably chlorine or bromine and Me a heavy metal such as iron or zinc, but preferably tin. The symbols $m$ and $n$ mean integers from 1 to 4 each and preferably together 4, 6 or 8. $R_1$ and $R_2$ may be equal or different and represent hydrogen or a monovalent hydrocarbon radical of 1 to 14 carbon atoms, which may contain ether oxygen and which may be normal, branched or cyclic and of aliphatic or aromatic nature. More specifically $R_1$ and $R_2$ generally are alkyl, aralkyl or aryl radicals and preferably have 1 to 6 carbon atoms. Also $R_1$ and $R_2$ may be connected to one single bivalent radical. Suitable radicals are the methyl, ethyl, propyl, isopropyl, the various butyl, amyl, hexyl or octyl radicals, dodecyl, cyclohexyl, phenyl, tolyl, benzyl. Suitable compounds $R_1OR_2$ are the monomethyl-, monoethyl- or monobutyl-ethers of ethylene glycol, dioxan or tetrahydrofuran.

Particularly suitable complex compounds are, for example, $Cl_2Sn(CH_3OH)_2$; $Cl_2Sn(C_4H_9OH)_2$;

$Cl_4Sn(C_2H_5OH)_2$ $Cl_4Sn \cdot O(C_2H_5)_2$ and $Cl_4Sn \cdot 4H_2O$. These compounds are for example used in an amount of 0.5 to 10, preferably 1 to 5% of the weight of the rubbery elastomers. The afore-mentioned compounds are for example described by F. Hein in "Chemische Koordinationslehre," Leipzig (Germany), 1950, pages 376 and 380 and are generally prepared by dissolving anhydrous metal halides in ethers or alcohols, preferably anhydrous compounds. Though generally the amount of alcohol is used, in some cases an excess of an alcohol may also be applied. Very effective activators are for example obtained by dissolving anhydrous stannous chloride in commercial methanol or butanol. The solutions obtained may become turbid in the course of time though their effectiveness remains almost unchanged.

Suitable halogen-donors are, as stated above, those compounds from which halogen or halogen halide is split off in the presence of one of the metal compounds and under the applied conditions, e.g. at a temperature above 70° C.

Halogen-donors include, for example, polymers or copolymers of vinyl chloride and/or vinylidene chloride with other polymerisable compounds, preferably those which contain no stabilizing agent; halogen containing plastics, for example polychloroprene; halogenated, for example chlorinated or brominated butyl rubber; halogenation or chlorosulphonation products of high-density or low-density polyethylene or higher polyolefins; colloidal mixtures of polyvinyl chloride with an acrylonitrile-butadiene copolymer; halogenated hydrocarbons containing halogen atoms which may be split off or which may split off hydrogen halide, for example liquid or solid chlorination products of paraffinic hydrocarbons of natural or synthetic origin; halogen containing factice; heptachlorocyclohexane; chlorinated acetic acids; acid halides, for example lauroyl, oleyl, stearyl or benzoyl chlorides or bromides, or compounds which contain the group >NHal, for example N-bromosuccinimide or N-bromo-phthalimide, compounds containing the structure

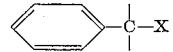

in which X is a halogen, preferably bromine or chlorine and in which the free valences may be bound to equal or different radicals, such as the afore-mentioned halogen, hydrogen, aliphatic or aromatic hydrocarbon radicals. Suitable compounds of this type are benzyl-, benzol- or benzotrichloride or homologues thereof or the corresponding bromides such as benzotribromide, further diphenyl- or triphenyl-chloromethane, diphenyl- or triphenyl-bromomethane or diphenyldibromo-methane. Compounds which have the formula

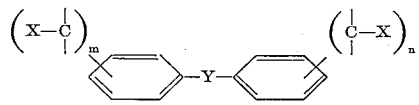

in which X is a halogen, preferably bromine or chlorine and Y an oxygen atom or an alkylene or a mononuclear aromatic hydrocarbon radical, such as a phenylene radical, and $m$ and $n$ are integers from 1 to 5, preferably 1 and 2. The alkylene group preferably is an alkylidene group of 1 to 6 carbon atoms, such as a methylene or isopropylidene group. The preferred compounds of this type are chloromethylated diphenyl oxides containing 2 to 4 chloromethyl groups such as bis-(chloromethyl)- or tetra-(chloromethyl)-diphenyloxide. Mixtures of various compounds may also be used. Bromo-compounds have been found to be particularly effective.

In order to form the said metal halides, for example, compounds of the following metals may be used: magnesium, cadmium, calcium, beryllium, zinc, lead, manganese, cobalt, nickel, antimony and especially tin and/or iron. The metals may be used in the form of the oxides or as chromium, titanium or aluminium, in the form of compound, e.g. in the form of salts of weak inorganic or organic acids such as formic, acetic, lauric, stearic, benzoic, chromic, lactic, silicic and carbonic acids. The basic salts of the acids may also be used. Furthermore, mixtures of several of these compounds may be used. Especially good results have been obtained by using iron salts of one of the above acids, e.g. stearic acid, if desired in mixture with stannous or zinc compounds.

The amount of halogen-doner and metal compound used in the mixture depends on their halogen and metal content respectively and the ease with which the halogen or hydrogen halide is split off. The amount of these compounds used also depends on the desired degree and conditions of vulcanisation. Generally, they are used in an amount such that 0.1 to 12, preferably 0.3 to 6 parts by weight of metal halide, based on 100 parts of the elastomer, are present or may be formed. However, smaller or larger amounts of halogen-donor and metal compound may be added, depending on the desired results. The ratio of metal compound, such as the zinc oxide, to halogen-donor may be varied within wide limits, and the amount of metal compound or halogen-donor may exceed that of the other components. For example, the metal compound may be added in such an amount that the amount of halogen or hydrogen halide is only sufficient to form a basic metal halide. When the metal halide is formed in situ in the mixture, a strong activation of the vulcanisation may be obtained by heating the mixture prior to the addition of the resin, for a short time, for example, for a period of 5 to 20 minutes, to a temperature between 70 and 250° C., preferably above 120° C. and up to 220° C. By the heat-treatment the metal halide is formed, which for its part acts onto the elastomers. Thereby the vulcanisation rate and the vulcanisation effect is increased.

By a suitable selection of the type and the amount of the metal halide and the halogen or the hydrogen halide donor respectively and the conditions of the heat treatment, which can be determined by a few experiments, the amount of the metal halide formed in the elastomer may be varied in wide limits and most favourable results may be attained.

If the rubber mixture is compounded on roll mills the heat treatment is generally carried out for a period up to 15 minutes for economic reasons. The metal halide may, however, also be added or the metal compound be reacted with the halogen-donor while storing or tempering the mixture at a temperature in the indicated range for a longer period, e.g. from 30 to 90 minutes.

The reaction of the halogen-donor and the metal compound may also be effected by mixing some or all of the ingredients of the mixture to be vulcanized, for example, in an internal mixer such as a Banbury mixer, at the aforesaid temperature. In this procedure it is not necessary to conduct the whole mixing procedure at the said temperature, it being sufficient to keep the mixture at that temperature only for a period sufficient to allow reaction between the metal compound and the halogen-donor. The formation of the metal halides in the elastomer may also occur in two stages, i.e. in part in the compounding procedure at the normal compounding temperature and in the other part during the vulcanisation.

In carrying out the invention the plastic, the resin, the metal halide and the other components may be compounded in any desired order according to the usual procedures adopted in the preparation of rubber mixtures. If the metal halide is added per se, the vulcanizing agent should be added and incorporated as late as possible in order to avoid premature vulcanizing of the mixture. It is also possible to mix the metal halide with the resin and then combine it therewith by slightly heating the mixture, which procedure facilitates the incorporation of the metal halide into the vulcanisation mixture and improves the vulcanisation effect. If the metal halide is to be produced in situ from a metal compound it is advantageous to incorporate the metal compound and the halogen-donor in the mixture first in order to provide a good distribution of these components in the plastic so as to ensure that the greatest possible amount of metal halide is formed. Any additional components, for example stearic acid, palmitic acid, myristic acid or lauric acid or other auxiliary substances, may then be added, such as paraffins, waxes or aging preservatives such as derivatives of p-phenylene diamine. Novolaks which per se do not effect curing, and/or terpene phenol resins may additionally be used in order to improve tackiness. Suitable novolaks are e.g. derived from p-alkylphenols, the alkyl radical of which has from 4 to 12 carbon atoms and may contain an olefinic bond; thus it may be the tert. butyl-, amyl-, iso-octyl-, nonyl-, dodecyl- or dodecenyl radical.

The starting products used according to the invention may also be mixed with other plastics or elastomers before cross-linking them, for example, with polymers or copolymers of ethylene, propylene, isobutylene, or butyl rubber, natural rubber, polyisoprene, polybutadiene, copolymers of butadiene with acrylonitrile and/or styrene, polychloroprene. Generally the portion of this component is not higher than 50 percent by weight.

If, in order to improve the activating effect of the metal halide, the mixture is heated to above 120° C. and placed for a short while between rolls or kneaded or stored, it is preferable to add the resin used as vulcanising agent only after the mixture has cooled.

It is also possible to add before or during the heat treatment a small amount of a resin acting as cross-linking agent, e.g. about 0.1 to 1.5 parts for every 100 parts. In this case, some crosslinking occurs during the heat-treatment which affects the compounding process only slightly.

The mixture may be vulcanised and moulded by any convenient procedure, for example, by heating in hot air or steam at temperatures above 100° C., for example up to 220° C., or by pressing in heated moulds. It is preferred to effect the vulcanisation at temperatures between 150 and 170° C. and for periods of 5 to 60 minutes. In order to shorten the vulcanisation process, it is possible to work at temperatures of above 170° C. Generally, the mixtures may be prepared while using fillers such as carbon black or lightly coloured fillers, preferably active silicic acid. The products obtained may be used for the manufacture of commercial rubber goods, e.g. sole material, tyres, inner tubes, packing sheets, door mats, shock absorbers, cable insulations, automobile accessories and other commercial rubber goods.

EXAMPLE 1

The following mixture was produced:

| Mixture | I | II | III |
|---|---|---|---|
| Ethylene-propylene-dicyclopentadiene rubber with about 3,5–4 double bonds per 1000 carbon atoms | | 100 | |
| Ethylene-propylene-dicyclopentadiene rubber with about 5 double bonds per 1,000 carbon atoms | 100 | | 100 |
| High abrasion furnace carbon black (HAF-grade) | 45 | 45 | |
| Super abrasion furnace carbon black (ISAF-grade) | | | 45 |
| Stearic acid | 1 | 1 | 2 |
| SnCl$_2$·2H$_2$O | 3 | 4 | 3 |
| Resin A | 6 | | |
| Resin B | | 6 | 10 |

The carbon black and the rubber are mixed together and the stearic acid, the stannous chloride and the resin are incorporated one after another into this mixture. The order of the additions may, however, be modified. The mixture was produced at 90–100° C., but the use of higher or lower temperatures is also possible. The resins have been produced by condensation, in an alkaline medium, of formaldehyde with p-tert.-butylphenol (resin A), or with p-octylphenol, respectively (resin B). The mixture is then vulcanized at 160° C. and the following values are obtained:

| Mixture | I | | | II | | III | |
|---|---|---|---|---|---|---|---|
| Vulcanisation time (min.) | 40 | 60 | 90 | 60 | 90 | 60 | 90 |
| Tensile strength (kg./cm.$^2$) | 100 | 130 | 134 | 102 | 117 | 133 | 144 |
| Elongation at break (percent) | 380 | 361 | 323 | 432 | 349 | 319 | 285 |
| Modulus 150 (kg./cm.$^2$) | 24 | 30 | 38 | 18 | 24 | 41 | 50 |
| Modulus 300 (kg./cm.$^2$) | 71 | 98 | 121 | 58 | 91 | 125 | |
| Permanent elongation [1] | 31 | 22 | 13 | 33 | 18 | 12 | 10 |
| Tear resistance [2] | 13 | 11 | 13 | 16 | 10 | 12 | 10 |
| Hardness (° Shore A) | 62 | 63 | 64 | 60 | 62 | 65 | 68 |
| Rebound elasticity | 45 | 46 | 46 | 47 | 45 | 37 | 37 |

[1] The permanent elongation is the increase (in percent) of the determined length of the standard ring RI (DIN 53,504) immediately after the tearing.
[2] The tear resistance is the resistance against tearing further, measured at the standardized ring RII (DIN 53,504) bearing three notches.

As filler, silicic acid grades may also be used instead of carbon black. Then it is suitable to increase the amount of the resin to about 8 to 12 parts.

In this and the following examples all tests have been made while using standardized rings in which the distance between the inner and outer radius is 4 mm. and which have a thickness of 6 mm.

EXAMPLE 2

This example shows carrying out the vulcanisation with the aid of a reacted product from p-dodecylphenol-dialcohol and SnCl$_2$·2H$_2$O instead of SnCl$_2$·2H$_2$O. Products of this type are obtained according to Austrian patent specification 219,845 by dissolving p-dodecylphenoldialcohol and SnCl$_2$·2H$_2$O in acetone and by slight heating.

The product used and prepared from p-dodecylphenoldialcohol and $SnCl_2 \cdot 2H_2O$ contains about 28% of tin and 16% of chlorine.

| Mixture | IV |
|---|---|
| Ethylene-propylene-dicyclopentadiene-copolymer as described in mixture III | 100 |
| Stearic acid | 1 |
| Combination product of dodecylphenol-dialcohol and $SnCl_2 \cdot 2H_2O$ | 6 |
| Super-abrasion furnace (SAF-grade) | 45 |
| Resin from p-octylphenol and formaldehyde (prepared by condensing in an alkaline medium) | 6 |

The mixture was prepared as described in Example 1. Vulcanisation temperature: 160° C.

| Mixture | IV | |
|---|---|---|
| Vulcanisation time (min.) | 60 | 90 |
| Tensile strength (kg./cm.²) | 98 | 122 |
| Elongation at break (Percent) | 348 | 316 |
| Modulus 150 (kg./cm.²) | 20 | 21 |
| Modulus 300 (kg./cm.²) | 81 | 112 |
| Permanent elongation (Percent) | 25 | 16 |
| Tear resistance (kg./cm.) | 13 | 10 |
| Hardness (° Shore A) | 64 | 65 |
| Rebound elasticity | 38 | 37 |

EXAMPLE 3

This example shows the activation of the vulcanisation by metal salts of organic acids and compounds from which halogen or hydrogen halide may easily be split off. The mixtures are rolled for about 10 minutes before the addition of the phenol resin.

| Mixture | V | VI | VII | VIII |
|---|---|---|---|---|
| Ethylene-propylene-dicyclopentadiene-copolymer as described in Mixture III | 100 | 100 | 100 | 100 |
| Stearic acid | 1 | 1 | 1 | |
| Diphenylbromomethane | 3 | 3 | 3 | |
| N-bromo-succinimide | | | | 2.5 |
| Iron stearate | 2 | 2 | 2 | 2 |
| Tin stearate | | | 1 | |
| Super-abrasion furnace (SAF carbon black) | 45 | 45 | 45 | 45 |
| Resin from p-isooctylphenol and formaldehyde (obtained by condensation in an alkaline medium) | 6 | 6 | 6 | 10 |

*Manufacture of the mixtures*

The copolymer is first placed on the roll until a sheet is formed. Then the other ingredients of the mixture are worked in with exception of the phenol resin. The order, in which the ingredients of the mixture are introduced, is not important. In this procedure the temperature of the mixture is about 90° C. Then the mixture is taken away and placed onto a rolling mill with heated rolls. After the formation of the sheet the temperature of the mixture shall be between 130 and 250° C. (measured with a commercial pyrometer). The mixtures are hot rolled for 10 minutes at the following temperatures

|  | ° C. |
|---|---|
| Mixture V | 160–180 |
| Mixture VI | 175–180 |
| Mixture VII | 170–180 |
| Mixture VIII | 160–165 |

The mixtures are taken off while still hot and are mixed in a third working step with the phenol resin, the mixing temperature being about 90° C.

Vulcanisation temperature 160° C.
Test results of the vulcanisates:

| Mixture | V | | VI | | VII | | VIII | |
|---|---|---|---|---|---|---|---|---|
| Vulcanisation time (min.) | 60 | 90 | 60 | 90 | 60 | 90 | 60 | 90 |
| Tensile strength (kg./cm.²) | 149 | 132 | 141 | 150 | 123 | 131 | 111 | 129 |
| Elongation at break (Percent) | 328 | 286 | 358 | 353 | 374 | 375 | 446 | 400 |
| Modulus 150 (kg./cm.²) | 28 | 32 | 24 | 24 | 20 | 20 | 14 | 17 |
| Modulus 300 (kg./cm.²) | 127 | | 101 | 111 | 83 | 87 | 52 | 74 |
| Permanent elongation (Percent) | 12 | 11 | 17 | 13 | 20 | 22 | 28 | 21 |
| Tear resistance (kg./cm.) | 7 | 6 | 11 | 9 | 10 | 10 | 13 | 11 |
| Hardness (°Shore A) | 57 | 58 | 56 | 57 | 56 | 56 | 55 | 55 |
| Rebound elasticity (Percent) | 43 | 43 | 40 | 40 | 41 | 40 | 40 | 41 |

The manufacture of the mixtures described in this example can be substantially simplified by working in an internal mixer. The effect otherwise attained by rolling at higher temperatures for a longer time may then be obtained by kneading at suitable temperatures for a short time. The resin which is used as a vulcanisation agent may if desired be incorporated at the end of the mixing procedure, if the mixing time required therefor is so short that no vulcanisation occurs yet. The example further shows the good suitability of iron stearate as well as of diphenylbromomethane for the vulcanisation of the rubber types used according to the invention. Vulcanisates with a good vulcanisation level may also be obtained by simultaneous addition of iron- and tin- or zinc stearate.

At the dosage of the metal and the halogen-containing compounds there may be paid particular attention, that they are used in a suitable quantitative relation. By using too large amounts of halogen-containing substances there may occur during the heat rolling a depolymerisation of the ethylene-propylene-copolymer. Mixtures deteriorated in such a way are no longer vulcanisable.

EXAMPLE 4

Mixtures IX to XI were produced as described in Example 1 and mixtures XII and XIII as follows: The elastomer and the chlorosulfonated polyethylene were milled between rollers and the stearic acid, zinc oxide and carbon black were worked in in a conventional manner. The mixture was then rolled between heated rolls for 10 minutes, the temperature on the surface of the mixture being in the range from 190 to 205° C. The curing resin was added after the mixture was cooled down to a temperature between 80 and 100° C. Mixtures IX and X described the joint use of ethylene-propylene-terpolymer rubber types with other elastomers. Mixture XI describes the use of stannic chloride. The rubber used in mixtures XII and XIII consisted of copolymerisation product of 59% ethylene, 0.8 mol-percent diene (presumably 5-methylene-norbornene-2), the remaining portion being propylene.

| Mixture | IX | X | XI | XII | XIII |
|---|---|---|---|---|---|
| Ethylene-propylene-dicyclopentadiene rubber (as in Mixture I) | 95 | 75 | 100 | | |
| Ethylene-propylene-terpolymer rubber (Esso) (Enjay EPT 3509) | | | | 98 | 98 |
| Chlorosulfonated polyethylene (29% Cl, 1.25% S) | 5 | | | 2 | 2 |
| Chlorobutyl rubber (about 1.2% Cl) | | 25 | | | |
| Stearic acid | 1 | 1 | 1 | 1 | 1 |
| Zinc oxide | | | | 1.1 | 1.1 |
| High abrasion furnace carbon black | 45 | 45 | 45 | 45 | 45 |
| $SnCl_2 \cdot 2H_2O$ | 3 | 3 | | | |
| $SnCl_4 \cdot 4H_2O$ | | | 2 | | |
| p-Iso-octylphenol resin (with about 2 mols of added formaldehyde) | 6 | 6 | 6 | 10 | |
| p-Iso-octylphenol resin (with about 1.5 to 1.7 mols of added formaldehyde) | | | | | 10 |

Test results (Vulcanisation temperature 170° C.)

In all cases rapid and very good vulcanisation effects were obtained as is evident from the following table of the test results.

| M (Mixture) | t Vulcanisation time, min. | T Tensile strength, kg./cm.² | E Elongation at break, percent | M 150 | M 300 | PE Permanent elongation, percent | TR Tear resistance, kg./cm. | H Hardness, ° Shore A | R Rebound elasticity, percent |
|---|---|---|---|---|---|---|---|---|---|
|   |   |   |   | Moduli at 150% and 300% elongation, kg./cm.² | | | | | |
| IX | 20 | 122 | 371 | 38 | 94 | 24 | 10 | 71 | 46 |
|    | 40 | 132 | 359 | 43 | 107 | 19 | 11 | 74 | 47 |
|    | 60 | 132 | 348 | 43 | 112 | 17 | 9 | 74 | 46 |
| X  | 20 | 132 | 314 | 47 | 127 | 10 | 10 | 62 | 33 |
|    | 40 | 152 | 305 | 56 | 150 | 8 | 9 | 65 | 32 |
|    | 60 | 157 | 312 | 56 | 152 | 8 | 8 | 65 | 32 |
| XI | 20 | 145 | 395 | 36 | 104 | 14 | 14 | 64 | 50 |
|    | 40 | 157 | 420 | 39 | 107 | 16 | 15 | 65 | 49 |
|    | 60 | 128 | 354 | 35 | 104 | 13 | 15 | 65 | 48 |
| XII | 20 | 151 | 367 | 35 | 115 | 10 | 14 | 67 | 50 |
|     | 40 | 141 | 282 | 51 |     | 7 | 10 | 70 | 51 |
|     | 60 | 152 | 270 | 58 |     | 6 | 9 | 70 | 51 |
| XIII | 20 | 183 | 386 | 41 | 132 | 11 | 13 | 69 | 50 |
|      | 40 | 180 | 347 | 48 | 148 | 6 | 12 | 70 | 51 |
|      | 60 | 165 | 302 | 54 | 167 | 6 | 10 | 70 | 50 |

This example describes the vulcanisation of a commercial ethylene-propylene-terpolymer rubber having a specific weight of 0.85 and a Mooney-viscosity ML 1+4 (121° C.) of 70, the multiple olefinically unsaturated component of which is different from dicyclopentadiene and is probably hexadiene. This rubber is soluble in benzene, hexane, cyclohexane, tetrachloroethylene and carbon tetrachloride and excellently storable.

Besides, mixture XV shows the use of a resin often used in the rubber industry as a tackifier and plasticizer. Mixtures XVI to XVIII show a vulcanisation in the presence of a halogen donor and metal salts capable of forming metal halides under the curing conditions.

Mixtures XIV and XV were produced according to Example 1, while mixtures XVI and XVII were heated between rollers for 10 minutes at a temperature in the range from 190 to 200° C., before the curing resin was added. In mixtures XIX, XXI and XXII the stannic chloride was applied as a 75% dispersion in a polyethylene (mixture XIX) or polyisobutylene (mixtures XXI and XXII) respectively. In mixture XX the stannus chloride had at first been dissolved in the resin. This solution had been prepared as follows:

4 mols of formaldehyde were condensed to 1 mol of para,para'-dihydroxydiphenylpropane-2,2 and the methylol groups formed were subsequently etherified by butanol, until a resin was formed which was completely compatible with gasoline. The liquid product containing about 72% of solid resin, was heated to a temperature in the range from 60 to 70° C. Then the solid $SnCl_2 \cdot 2H_2O$ was added and stirred for such a long time, until a practically homogeneous solution was formed.

| Mixture | XIV | XV | XVI | XVII | XVIII | XIX | XX | XXI | XXII |
|---|---|---|---|---|---|---|---|---|---|
| Ethylenepropyleneterpolymer rubber (Nordel 1070 of Du Pont) | 100 | 100 | 100 | 100 | 100 | 100 | 100 | 100 | 100 |
| Stearic acid | 1 | 1 | 1 | 1 | 1 | 1 | 1 | 1 | 1 |
| High abrasion furnace carbon black | 45 | 45 | 45 | 45 | 45 | 45 | 45 | 45 | 45 |
| $SnCl_2 \cdot 2H_2O$ | 3 | 3 |   |   |   | 3 | 2 | 3 | 3 |
| Diphenylbromomethane |   |   | 3 |   | 3 |   |   |   |   |
| Iron stearate |   |   | 1 | 2 | 2 |   |   |   |   |
| Tin palmitate |   |   | 2 |   |   |   |   |   |   |
| p-Iso-octylphenol resin (with about 2 mols of added formaldehyde) | 6 | 6 | 6 | 6 | 6 |   |   |   |   |
| 2,6-dimethyl-3,5-dimethyl-4-chlorophenol |   |   |   |   |   | 6 |   |   |   |
| Bisphenol resin |   |   |   |   |   |   | 6 |   |   |
| p-Iso-octylphenol resin containing bromomethyl groups (3.5% Br) |   |   |   |   |   |   |   | 6 | 12 |
| Novolak from p-isooctylphenol (with about 0.8 mol of added formaldehyde) |   | 4 |   |   |   |   |   |   |   |

Tests results

In the following tables the abbreviations have the same meaning as in the table of Example 4.

| Mixture | t | T | E | M 150 | M 300 | PE | TR | H | R |
|---|---|---|---|---|---|---|---|---|---|
| XIV | 20 | 165 | 754 | 11 | 34 | 57 | 24 | 56 | 50 |
|     | 40 | 204 | 697 | 15 | 52 | 28 | 23 | 59 | 50 |
|     | 60 | 210 | 689 | 15 | 56 | 21 | 23 | 60 | 50 |
| XV  | 20 | 155 | 894 | 10 | 22 | 65 | 29 | 55 | 46 |
|     | 40 | 175 | 818 | 11 | 31 | 50 | 31 | 56 | 46 |
|     | 60 | 176 | 796 | 10 | 32 | 44 | 30 | 58 | 46 |
| XVI | 20 | 150 | 793 | 6 | 24 | 55 | 25 | 53 | 48 |
|     | 40 | 175 | 762 | 8 | 35 | 41 | 25 | 54 | 48 |
|     | 60 | 188 | 748 | 10 | 41 | 34 | 25 | 55 | 48 |
| XVII | 20 | 193 | 678 | 10 | 51 | 26 | 21 | 56 | 49 |
|      | 40 | 197 | 642 | 13 | 57 | 20 | 19 | 56 | 49 |
|      | 60 | 202 | 622 | 15 | 67 | 5 | 19 | 57 | 49 |
| XVIII | 20 | 140 | 520 | 16 | 63 | 13 | 15 | 60 | 48 |
|       | 40 | 150 | 534 | 17 | 68 | 13 | 14 | 60 | 48 |
|       | 60 | 152 | 505 | 19 | 75 | 10 | 14 | 61 | 48 |
| XIX | 20 | 146 | 688 | 15 | 41 | 50 | 22 | 60 | 48 |
|     | 40 | 190 | 646 | 21 | 70 | 26 | 21 | 62 | 48 |
|     | 60 | 190 | 562 | 25 | 84 | 16 | 17 | 63 | 48 |
| XX  | 20 | 67 | 595 | 10 | 24 | >65 | 17 | 60 | 55 |
|     | 40 | 90 | 526 | 12 | 35 | 50 | 21 | 60 | 55 |
|     | 60 | 103 | 545 | 13 | 39 | 49 | 20 | 60 | 55 |
| XXI | 20 | 159 | 684 | 10 | 35 | 38 | 25 | 57 | 46 |
|     | 40 | 181 | 568 | 15 | 61 | 18 | 23 | 59 | 46 |
|     | 60 | 156 | 456 | 19 | 78 | 13 | 20 | 60 | 44 |
| XXII | 20 | 176 | 728 | 11 | 38 | 33 | 24 | 56 | 45 |
|      | 40 | 200 | 569 | 18 | 75 | 14 | 20 | 60 | 44 |
|      | 60 | 200 | 468 | 27 | 106 | 8 | 15 | 61 | 45 |

EXAMPLE 6

The following mixtures were prepared in a manner known per se on rollers as used in a laboratory. It proved to be suitable to incorporate the liquid activator together with the filler. Mixing was effected at about 80 to 90° C. The vulcanization took place at 170° C.

| Mixture | XXIII[1] | XXIV | XXV | XXVI |
|---|---|---|---|---|
| Ethylene-propylene dicyclopentadiene rubber [2] | 100 | 100 | 100 | 100 |
| Stearic acid | 1 | 1 | 1 | 1 |
| High abrasion furnace carbon black | 45 | 45 | 45 | 45 |
| $SnCl_2 \cdot 2H_2O$ | 3 | | | |
| $SnCl_2 \cdot 2H_2O$, dissolved in commercial methanol ($SnCl_2$-content, 76%) | | 3.5 | | |
| Activator A | | | 4 | |
| Activator B | | | | 5 |
| p-Iso-octylphenol resin (with about 2 mols of added formaldehyde) | 6 | 6 | 6 | 6 |

[1] For comparison purposes.
[2] Propylene-content about 40% by weight; 1.3 mol-percent unsaturation.

Activator A was produced by dissolving 47.4 g. of anhydrous $SnCl_2$ in 16.0 g. of commercial methanol. A clear solution was obtained containing 75% of $SnCl_2$. In similar manner a solution containing about 46% $SnCl_2$ was obtained by dissolving 47.4 g. of anhydrous $SnCl_2$ in 55.5 g. n-butanol. The latter mixture is termed "activator B."

The abbreviations have the same meanings as in the table of Example IV.

Test results

| M | t | T | E | M 150 | M 300 | PE | TR | H | R |
|---|---|---|---|---|---|---|---|---|---|
| XXIII[1] | 20 | 81 | 428 | 17 | 49 | 40 | 15 | 59 | 47 |
| | 40 | 159 | 426 | 30 | 99 | 19 | 13 | 63 | 47 |
| | 60 | 151 | 349 | 36 | 122 | 12 | 12 | 64 | 47 |
| XXIV | 20 | 74 | 457 | 16 | 42 | 48 | 16 | 59 | 47 |
| | 40 | 142 | 397 | 28 | 94 | 18 | 13 | 63 | 46 |
| | 60 | 170 | 413 | 31 | 109 | 14 | 14 | 64 | 46 |
| XXV | 20 | 136 | 479 | 23 | 71 | 32 | 15 | 60 | 47 |
| | 40 | 164 | 400 | 34 | 113 | 15 | 13 | 63 | 47 |
| | 60 | 168 | 366 | 41 | 130 | 11 | 11 | 65 | 47 |
| XXVI | 20 | 131 | 336 | 36 | 112 | 14 | 13 | 64 | 49 |
| | 40 | 156 | 331 | 44 | 136 | 10 | 10 | 65 | 49 |
| | 60 | 155 | 313 | 46 | 146 | 8 | 10 | 65 | 48 |

[1] For comparison purposes.

A comparison of the results of mixtures XXIII to XXVI, particularly of the values of moduli 150 and 300, shows that a more rapid and more intense vulcanization was achieved by using activator A. Mixture XXVI using activator B was cured even quicker and more intense than mixture XXV. The moduli values of these mixtures vulcanized for 20 minutes were more than double as high as those of mixtures XXIII and XXIV.

Resort may be had to modifications and variations of the disclosed embodiments without departing from the spirit of the invention or the scope of the appended claims.

What is claimed is:

1. The method of vulcanizing ethylene-propylene terpolymers, the third component of which is at least one multiple olefinically unsaturated compound having 4 to 14 carbon atoms, with a phenol aldehyde resin which comprises vulcanizing an elastomer composition of said ethylene-propylene terpolymer, a phenol aldehyde resin, a filler and a complex compound of the general formula $X_mMe(R_1OR_2)_n$, wherein in the said formula, X is a halogen, Me is a heavy metal of a specific gravity greater than 4, $m$ and $n$ are integers from 1 to 4 each and $R_1$ and $R_2$ are radicals selected from the group consisting of hydrogen and radicals having from 1 to 14 carbon atoms being monovalent hydrocarbon radicals, monovalent hydrocarbon radicals interrupted by an ether oxygen atom, and bivalent derivatives of that radical in which the two valences are bound to $R_1$ and $R_2$ so as to form a ring with the group $R_1OR_2$.

2. The method of claim 1, wherein the phenol aldehyde resin is derived from an aldehyde and a phenol having from 1 to 7 carbon atoms and contains in addition to groups selected from the group consisting of free phenolic hydroxy and esterified phenolic hydroxy, groups selected from the group consisting of free alcoholic hydroxy, etherified alcoholic hydroxy and esterified alcoholic hydroxy.

3. The method of claim 2, wherein X is selected from the group consisting of chlorine and bromine.

4. The method of claim 2, wherein the heavy metal is tin.

5. The method of claim 2, wherein $m$ and $n$ together are an even number in the range from 4 to 8.

6. The method of claim 1, wherein the vulcanization is carried out in the presence of $SnCl_4 \cdot 4H_2O$.

7. The method of claim 1, wherein the vulcanization is carried out in the presence of $Cl_2Sn(CH_3OH)_2$.

8. The method of claim 1, wherein the vulcanization is carried out in the presence of $Cl_2Sn(C_4H_9OH)_2$.

9. The method of claim 1, wherein the said complex compound is present in an amount of 0.5 to 10% of the weight of the terpolymer.

10. The method of claim 2, wherein the terpolymer is present in an amount of 1 to 5%.

11. Vulcanization products of ethylene-propylene terpolymers with a phenol aldehyde resin and a complex compound activator as specified in claim 1.

12. Shaped bodies comprising vulcanization products of claim 11.

13. The method of claim 2, wherein the multiple olefinically unsaturated component of the terpolymer is a diolefinically unsaturated hydrocarbon free from conjugated double bonds.

14. A process for cross-linking unsaturated copolymers which comprises vulcanising (1) at least one unsaturated copolymer selected from the group consisting of (I) copolymers of at least one multiple olefinically unsaturated compound with at least one straight-chained mono-olefinic hydrocarbon, (II) copolymers of a multiple olefinically unsaturated compound with a mono-olefinic hydrocarbon component containing up to 90 mol percent, calculated on the total mono-olefin component, of at least one branched mono-olefinic hydrocarbon, the remaining portion being at least one straight chained mono-olefinic hydrocarbon, and (III) copolymers of at least one cyclic multiple olefinically unsaturated compound containing at least 10 mol percent of a cyclic compound with at least one branched mono-olefinic hydrocarbon, the multiple olefinically unsaturated compound of said copolymers (I) to (III) being copolymerized therein in an amount of not more than 10 mol percent, (2) 1 to 15 parts by weight of at least one phenol aldehyde resin, calculated per 100 parts by weight of copolymer, the aldehyde component of which phenol aldehyde resin contains from 1 to 7 carbon atoms, in the presence of (3) a halogen donor together with a compound selected from the group consisting of oxides and salts of weak acids of metals of groups II and III of the periodic table and heavy metals other than those belonging to groups II and III and having a specific gravity greater than 4 which metal compound is reactive with said halogen donor at a temperature above 70° C. in amounts capable of forming 0.1 to 12% by weight of the metal halide, based on the weight of the copolymer, the halogen of the halides having an atomic weight of at least 35, the phenol aldehyde resin containing in addition to groups selected from the group consisting of free phenolic hydroxy and esterified phenolic hydroxy, groups selected from the group consisting of free alcoholic hydroxy, etherified alcoholic hydroxy, esterified alcoholic hydroxy and halomethyl.

15. A process as claimed in claim 14, wherein the copolymer has been prepared from at least one multiple olefinically unsaturated compound and at least one straight-chained mono-olefinic hydrocarbon.

16. A process as claimed in claim 14 wherein the copolymer has been prepared from a cyclic multiple olefinically unsaturated compound and a hydrocarbon component comprising branched mono-olefinic hydrocarbons.

17. A process as claimed in claim 14, wherein the copolymers are hydrocarbons.

18. A process as claimed in claim 17, wherein the multiple olefinically unsaturated compound consists to at least 50 mol percent of a cyclic compound.

19. A process as claimed in claim 18, wherein the multiple olefinically unsaturated compound of the copolymer is a cyclic diolefin.

20. A process as claimed in claim 19, wherein the cyclic diolefin contains a ring of 5 carbon atoms containing one olefinic bond.

21. A process as claimed in claim 20, wherein the cyclic diolefin is dicyclopentadiene.

22. A process as claimed in claim 14, wherein the multiple olefinically unsaturated compound contains 4 to 14 carbon atoms.

23. A process as claimed in claim 14, wherein the straight-chained mono-olefinic hydrocarbon contains 2 to 10 carbon atoms.

24. A process as claimed in claim 14, wherein the multiple olefinically unsaturated compound is free from conjugated double bonds.

25. A process as claimed in claim 14, wherein the diene component is contained in the copolymer in an amount from 1 to 5 mol percent.

26. A process as claimed in claim 14, wherein the copolymer to be vulcanized is admixed before the vulcanization with up to 50% by weight, calculated on the mixture of the copolymers, with at least one elastomer selected from the group consisting of polymers of ethylene, propylene and isobutylene, butyl rubber, natural rubber, polyisoprene, polybutadiene, butadiene-acrylonitrile copolymers, butadiene-styrene copolymers, butadiene-acrylonitrile-styrene copolymers and polychloroprene.

27. A process as claimed in claim 26, wherein the copolymer is butyl rubber.

28. A process as claimed in claim 14, wherein the phenol aldehyde resin is applied in an amount from 3 to 9 parts by weight for every 100 parts of copolymer.

29. A process as claimed in claim 14, wherein the phenol aldehyde resin is a condensation product of formaldehyde and a phenol.

30. A process as claimed in claim 14, wherein two of the three positions ortho, ortho, para to the phenolic hydroxy group are unsubstituted, while the third one is substituted by a hydrocarbon radical of 4 to 12 carbon atoms.

31. A process as claimed in claim 14, wherein the mixture to be vulcanized contains a halogen-donor and a compound selected from the group consisting of oxides and salts of weak acids of a metal specified in claim 16, which metal compound is reactive with said halogen-donor in an amount such that 0.3 to 6 parts by weight of the metal halide may be formed in the mixture to be vulcanized for every 100 parts of the copolymer.

32. A process as claimed in claim 14, wherein the halogen-component of compound 3 is selected from the group consisting of bromine and chlorine.

33. A process as claimed in claim 14, wherein the mixture to be vulcanized is heated prior to the addition of the phenol aldehyde resin for a short time to a temperature above 120° C. and up to 220° C.

34. A process as claimed in claim 14, wherein the mixture to be vulcanized is heated to a temperature above 70° C. and is admixed at the latest during this heat treatment with 0.1 to 1.5 parts of a phenol resin for every 100 parts of the copolymer.

35. A process for cross-linking unsaturated copolymers which comprises vulcanizing (1) at least one unsaturated copolymer of at least one diolefinically unsaturated hydrocarbon containing from 4 to 14 carbon atoms free from conjugated double bonds with a mixture of ethylene and at least one other straight-chained α-mono-olefinic hydrocarbon having from 3 to 10 carbon atoms, in which copolymer the diolefinically unsaturated hydrocarbon is copolymerized in an amount of not more than 10 mol percent, by (2) 1 to 15 parts by weight of at least one phenol formaldehyde resin, calculated per 100 parts by weight of copolymer, the aldehyde component of which phenol aldehyde resin contains from 1 to 7 carbon atoms, in the presence of (3) a compound selected from the group consisting of (A) halides of metals of groups (II) and (III) of the periodic table in an amount of 0.1 to 12% by weight, based on the weight of the copolymer, (B) halides of heavy metals other than those belonging to groups (II) and (III) and having a specific gravity greater than 4 in an amount of 0.1 to 12% by weight, based on the weight of the copolymer, and (C) a halogen-donor together with a compound selected from the group consisting of oxides and salts of weak acids of said metals which metal compound is reactive with said halogen-donor at a temperature above 70° C. in amounts capable of forming 0.1 to 12% by weight of the metal halide, based on the weight of the copolymer, the halogen of the halides having an atomic weight between 35 and 80 in the presence of (4) at least one filler, the phenol formaldehyde resin containing in addition to groups selected from the group consisting of free phenolic hydroxy and esterified phenolic hydroxy, groups selected from the group consisting of free alcoholic hydroxy, etherified alcoholic hydroxy, esterified alcoholic hydroxy and halomethyl.

36. A process as claimed in claim 35, wherein the diene component is contained in the copolymer in an amount from 0.5 to 10 mol percent.

37. A process as claimed in claim 14, wherein the halogen donor has the structure

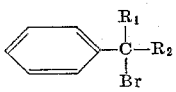

in which $R_1$ is a radical selected from the group consisting of hydrogen, bromine and phenyl and $R_2$ is a radical selected from the group consisting of bromine and phenyl.

38. Vulcanization products produced by means of phenol aldehyde resins from unsaturated copolymers selected from the group consisting of (I) copolymers of at least one multiple olefinically unsaturated compound with at least one straight-chained mono-olefinic hydrocarbon, (II) copolymers of a multiple olefinically unsaturated compound with a mono-olefinic hydrocarbon component containing up to 90 mol percent, calculated on the total mono-olefin component, of at least one branched mono-olefinic hydrocarbon, the remaining portion being at least one straight-chained mono-olefinic hydrocarbon, and (III) copolymers of at least one cyclic multiple olefinically unsaturated compound containing at least 10 mol percent of a cyclic component with at least one branched mono-olefinic hydrocarbon, the multiple olefinically unsaturated compound of said copolymers (I) to (III) being copolymerized therein in an amount of not more than 10 mol percent, said vulcanization products being produced in the presence of a halogen donor together with a compound selected from the group consisting of oxides and salts of weak acids of metals of groups II and III of the periodic table and heavy metals other than those belonging to groups II and III and having a specific gravity greater than 4 which metal compound is reactive with said halogen donor at a temperature above 70° C., in amounts capable of forming 0.1 to 12% by weight of the metal halide, the halogen of the halides having an atomic weight of at least 35, and the phenol aldehyde resins used as vulcanizing agents containing in addition to groups selected from the group consisting of free phenolic hydroxy and esterified phenolic hydroxy, groups selected from the group consisting of free alcoholic hydroxy, etherified alcoholic hydroxy, esterified alcoholic hydroxy and halomethyl, containing as their aldehyde component an aldehyde having from 1 to 7 carbon atoms, and being applied in an amount of 1 to 15 parts by weight for every 100 parts by weight of copolymer.

39. Shaped bodies comprising vulcanization products of claim 38.

40. A process as claimed in claim 35, wherein the metal halide is stannous chloride.

41. A process as claimed in claim 35, wherein the metal halide is applied in an amount such that 0.3 to 6 parts by weight are contained in the mixture to be vulcanized for every 100 parts of the copolymer.

No references cited.

MURRAY TILLMAN, *Primary Examiner.*

P. LIEBERMAN, *Assistant Examiner.*

UNITED STATES PATENT OFFICE
CERTIFICATE OF CORRECTION

Patent No. 3,287,440                                November 22, 1966

Arnold Giller

It is hereby certified that error appears in the above numbered patent requiring correction and that the said Letters Patent should read as corrected below.

Column 14, line 23, for "claim 2, wherein the terpolymer is" read -- claim 9 wherein the complex compound is --.

Signed and sealed this 17th day of December 1968.

(SEAL)
Attest:

Edward M. Fletcher, Jr.                            EDWARD J. BRENNER
Attesting Officer                                   Commissioner of Patents